United States Patent [19]

Everts

[11] Patent Number: 4,589,386

[45] Date of Patent: May 20, 1986

[54] CARBURETOR PRIMING SYSTEM FOR INTERNAL COMBUSTION ENGINES

[75] Inventor: Robert G. Everts, Chandler, Ariz.

[73] Assignee: Inertia Dynamics Corp., Chandler, Ariz.

[21] Appl. No.: 719,991

[22] Filed: Apr. 4, 1985

[51] Int. Cl.$^4$ ............................................. F02M 1/16
[52] U.S. Cl. ..................... 123/187.5 R; 261/DIG. 8
[58] Field of Search ................. 123/187.5 R, 187.5 P; 261/34 A, 95, 99, DIG. 8

[56] References Cited

U.S. PATENT DOCUMENTS 1,468,162  9/1923  LeMaire ..................... 123/187.5 R
3,323,293  6/1967  Santi ....................... 123/187.5 R X
4,335,061  6/1982  Kobayashi ............... 123/187.5 R X Primary Examiner—Tony M. Argenbright
Attorney, Agent, or Firm—William H. Drummond

[57] ABSTRACT

A carburetor priming system for an internal combustion engine includes a porous wick disposed in the inlet of the carburetor and a system for initially saturating the wick with liquid fuel prior to starting the engine. The priming system which may be remotely located or adjacent to the engine, which saturates the wick, consists of a depressable flexible bulb which withdraws fuel from a fuel supply and, when depressed, forces the fuel from the interior of the bulb into the wick. A check valve between the bulb and the wick is mechanically actuated to open when the bulb is depressed rather than being opened by fluid pressure as in conventional systems.

1 Claim, 6 Drawing Figures

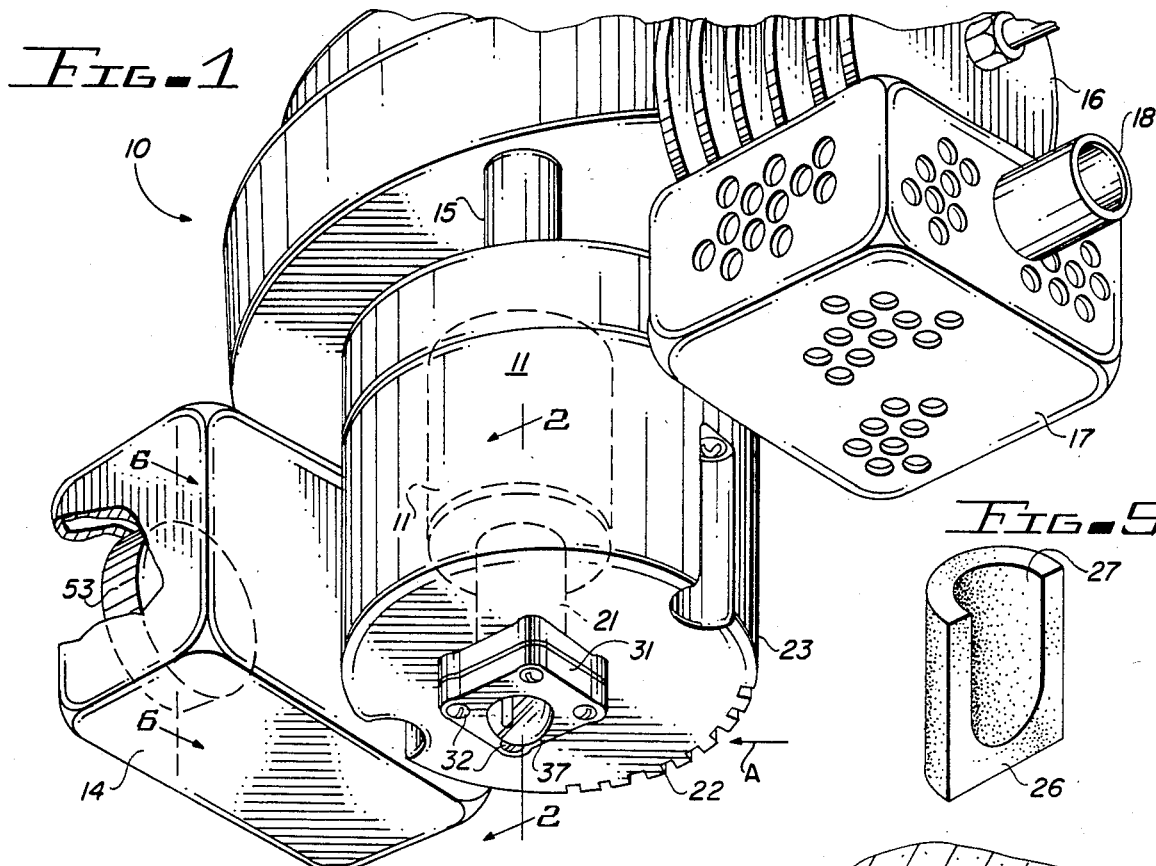
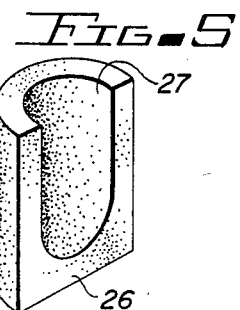
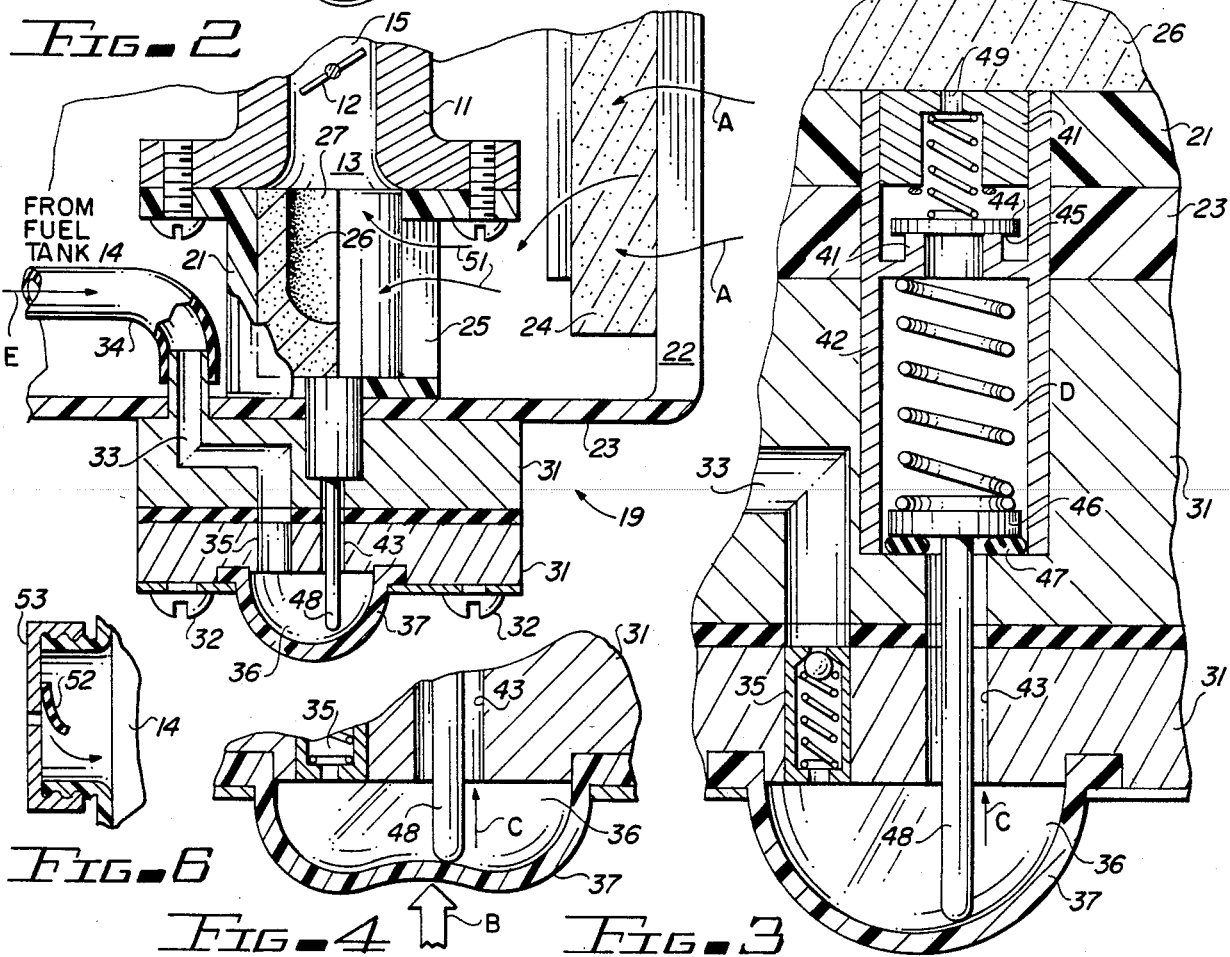

CARBURETOR PRIMING SYSTEM FOR INTERNAL COMBUSTION ENGINES

This invention relates to carburetor priming systems for internal combustion engines.

More particularly, the invention pertains to priming systems which can be advantageously used to improve the starting characteristics of two-cycle gasoline engines. In yet another respect the invention relates to a carburetor priming system which is adapted to be quickly and conveniently installed on existing engines or which can be supplied as original equipment.

Various systems have been proposed for improving the starting characteristics of carbureted internal combustion engines. Such systems include aparatus for directly injecting a quantity of unvaporized liquid fuel into the cylinder(s) or into the carburetor discharge during initial cranking of the engine. Other systems employ a porous wick which is saturated with the liquid fuel disposed at the carburetor air inlet to initially provide a fuel rich air-fuel mixture.

Such systems are especially important in improving the starting characteristics of two-cycle gasoline engines such as those employed on chain saws, power mowers and the like which have notoriously poor starting characteristics due to the configuration of their fuel supply systems.

According to the system proposed in U.S. Pat. No. 4,335,061 issued June 15, 1982, a priming fuel charge is injected into a porous wick in the carburetor throat by means of a priming pump formed integrally in the carburetor body. This pump includes a flexible bulb which can be depressed by thumb pressure. The interior of the bulb communicates through inlet and discharge passages with the primary fuel supply and the wick. Depression of the bulb forces fuel from the interior of the bulb into the wick. When thumb pressure on the bulb is released, the bulb resumes its normal shape and draws a fresh charge of fuel from the fuel supply into the interior of the bulb. Spring loaded check valves are alternately depressed in the inlet and discharge passages of the bulb. The inlet check valve is normally closed by spring pressure but opens when the bulb expands to permit fuel flow into the bulb. The outlet check valve is normally closed by spring pressure during the bulb-filling stage but opens under fuel pressure when the bulb is depressed to permit discharge of fuel into the wick. Although the priming system disclosed in this patent does have improved capabilities for priming two-cycle engines, this system suffers an operational disadvantage due to the fact that the discharge check valve spring must be weak enough to permit easy opening of the check valve when the bulb is depressed that the valve does not close positively during the bulb-filling portion of the pump cycle. Thus, when pressure on the bulb is released, air and a portion of the fuel from the wick are drawn into the interior of the bulb along with additional raw fuel from the bulb fuel supply line. Thus, the bulb is never completely full of liquid fuel when it is depressed and, consequently, priming is incomplete.

It would be highly advantageous to provide a carburetor priming system for internal combustion engines in which, once the priming fuel reservoir is filled by initial pump strokes at start-up, the priming pump discharges only liquid fuel when the pump is actuated and which fills completely with liquid fuel during the refill portion of the pump cycle. Once the priming fuel reservoir is filled at start-up, by initial pump strokes, it must be able to inject raw fuel into the carburetor inlet with the first pump stroke of the primer bulb and with each pump stroke thereafter.

Additionally, it would be advantageous to provide a priming system for two-cyce carbureted engines which is configured such that it can be installed on or remotely to existing engines, rather than being integrally formed in the original equipment carburetor.

It is therefore a principal object of the present invention to provide a direct, positive-action priming pump for internal combustion engines.

Yet another object of the invention is to provide a carburetor priming system which is especially adapted for use with two-cycle gasoline engines.

Yet another object of the invention is to provide a carburetor priming system which can be quickly and conveniently installed on existing engines or which can be conveniently furnished as an original equipment optional accessory.

These and other, further and more specific objects and advantages of the invention will be apparent to those skilled in the art from the following detailed description thereof, taken in conjunction with the drawings, in which:

FIG. 1 is a perspective view of a portion of a conventional two-cycle engine with the carburetor priming system of the present invention installed on the carburetor;

FIG. 2 is a cross-sectional view of the carburetor priming system of FIG. 1, taken along section line 2—2 thereof;

FIG. 3 is a further cross-sectional view showing additional details of the check valve assemblies of the priming system of FIG. 1;

FIG. 4 is a partial sectional view showing operation of the priming pump discharge check valve actuator rod by depression of the flexible bulb;

FIG. 5 is a partial sectional view of the porous wick portion of the priming system of FIGS. 1-3; and FIG. 6 is a sectional view of the cap of the fuel tank of FIG. 1.

Briefly, in accordance with the invention, the carburetor priming system is used in combination with an internal combustion engine which includes a carburetor having an air inlet, a fuel-air mixing throat and an air-fuel mixture outlet which communicates with the combustion chamber(s) of the engine. The priming system comprises a hollow housing having air inlet openings in the walls thereof, which housing is shaped and dimensioned to cover the air inlet of the carburetor. An air-permeable wick is retained in the housing. A priming fuel pump is provided which includes a depressable hollow resilient priming bulb, a priming fuel supply conduit extending between the engine fuel tank and the interior of the priming bulb, a priming fuel discharge conduit extending between the interior of the priming bulb and the wick, a normally closed first low pressure inlet check valve in the priming fuel supply conduit which opens to permit fuel to flow into the primary fuel reservoir, under the bulb, and which closes when the priming bulb is depressed, and a normally closed second high pressure discharge check valve disposed in the priming fuel discharge conduit, this second high pressure check valve being mechanically actuated by external pressure on the priming bulb to open when the priming bulb is depressed. A third low pressure discharge check valve, down stream from the second high pressure discharge check valve, discharges raw fuel directly into the carburetor inlet. This system of two discharge check valves in tandem; one mechanically operated high pressure valve, and one fluid pressure operated low pressure valve, allows a secondary liquid fuel reservoir to be placed in series with and down stream to the primary fuel reservoir so as to ensure that a raw liquid fuel supply is always immediately available for direct injection into the carburetor air inlet with each pump stroke of the bulb.

Turning now to the drawings, in which like reference numerals identify the same parts in the several views, FIG. 1 depicts the priming system of the invention, constructed in accordance with the presently preferred embodiment thereof, attached to a typical two-cycle internal combustion engine powered by gasoline or other vaporizable fuel, generally indicated by reference numeral 10. The engine 10 includes a conventional carburetor 11, having a butterfly throttle valve 12 (see FIG. 2) downstream of the carburetor air inlet throat 13. Liquid fuel is supplied from the fuel tank 14 to the carburetor 11 and the air-vaporized fuel mixture from the carburetor 11 passes through the carburetor outlet 15 into the combustion chamber(s) of the engine 10. The spent combustion products from the cylinder(s) 16 pass through the muffler 17 and are exhausted to the atmosphere through the exhaust pipe 18.

Referring also now to FIGS. 2-5, the priming system 19 includes a hollow housing 21 portion which is attached to the air inlet throat 13 of the carburetor 11. Air passes through inlet openings 22 formed in the air filter housing 23 (as indicated by the arrows A) through air filter media 24 and into the housing 21 through air inlet openings 25 formed in the said walls of the housing 21. The housing 21 receives and encloses a hollow porous wick 26, the open end 27 of which communicates with the air inlet throat 13.

A pump assembly 31 may be mounted close to the engine by means of bolts 32 on the air filter housing 23. The pump assembly 31 is provided with a liquid fuel inlet passage 33 which communicates with a flexible tubing 34 to conduct liquid fuel from the tank 14 to the pump 31. A spring actuated inflow check valve 35 is provided at the end of the fuel passage 33 which communicates with a pump cavity 36 formed by the transparent flexible bulb 37 mounted on and sealingly engaged with the outer end of the pump assembly 31.

Two outflow check valves 41 and 42 are provided at the inner end of the discharge passage 43 of the pump 31. The inner outflow check valve 41 is spring loaded to normally seat the closure disc 44 against the seat 45. The outer check valve 42 is spring loaded to normally seat the closure disc 46 against the O-ring sealing seat 47. An operating rod 48 connected to the closure disc 46 of the check valve 42 extends through the fuel outflow passage 43 of the pump 31. The outer end of the operating rod 48 is normally positioned, when the check valve 42 is closed, close to the inner surface of the bulb 37. External pressure indicated by the arrow B (FIG. 4) reduces the volume of the cavity 36 and, simultaneously, moves the operating rod 48 in the direction of the arrow C to unseat the sealing disc 46, opening check valve 42 to fill chamber D. When this occurs, fluid pressure in chamber D, in turn, opens check valve 41. When the forward movement of the priming pump bulb 37, indicated by the arrow B is halted, movement of the operating rod 48, in the direction of arrow C, ceases and the pressure in chamber D goes to zero, thereby causing the spring of check valve 41 to return the sealing disc 44 to its seat 45. When the outside restraining force that holds the priming pump bulb 37 in a depressed state is removed, the spring of check valve 42 returns the sealing disc 46 to its seat 47 and the operating rod 48 moves outward as the flexible membrane of bulb 37 retracts to its original convex shape. With the expansion of bulb 37 inducing a reduction of pressure in cavity 36 which causes fuel to flow as indicated by the arrow E from the fuel tank 14 through the tubing 34 and inflow passage 33 forcing check valve 35 to open to admit liquid fuel into and fill the cavity 36.

On the next cycle of the pump 31 pressure in the direction of the arrow B, exerted, for example, by the operator's thumb (not shown), opens check valves 42 and 41 and injects the liquid fuel from the outlet port 49 into the wick 26.

Air passing through and over the wick 26 as indicated by the arrows 51 entrains liquid and vaporized fuel from the wick 26 producing a very rich air-fuel mixture which is drawn into the throat 13 of the carburetor 11.

As shown in FIG. 6, an appropriate air inflow check valve 52 is provided in the filler cap 53 of the fuel tank 14 to ensure that a vacuum is not formed in the air space over the fuel which would prevent proper flow, by the force of ambient air pressure, of liquid fuel to the pump 31.

In operation, from a cold start, the operator simply depresses bulb 37 two or three times to saturate the wick 26 with liquid fuel. Thereafter, when the engine 10 is cranked, the very rich air-fuel mixture admitted to the throat 13 of the carburetor 11 serves to provide the necessary fuel rich mixture to the engine for the first few seconds of operation to permit the engine to continue operating until normal fuel flow through the carburetor 11 is established.

The system of the present invention is to be distinguished from the closest prior art in the use of the positive mechanically actuated high pressure check valve to ensure that the primary chamber 36 and the secondary chamber D fill completely with liquid priming fuel which is to be injected into the carburetor air inlet wick 26 on the next stroke of the priming pump bulb 37.

Having described my invention in such terms as to enable those skilled in the art to understand and practice it and, having described the presently preferred embodiment thereof, I claim:

1. A carburetor priming system for an internal combustion engine, said engine including
   a fuel tank,
   a carburetor having
      an air inlet,
      a fuel-air mixing throat, and
      an air-fuel mixture outlet communicating with the combustion chambers of said engine,
   said priming system comprising, in combination:
   (a) a hollow housing having air inlet openings in the walls thereof, shaped and dimensioned to cover the air inlet of said carburetor;
   (b) an air-permeable wick retained in said housing;
   (c) priming fuel pump means, including
      (i) a depressable hollow resilient priming bulb,
      (ii) a priming fuel supply conduit extending between said fuel tank and the interior of said priming bulb,
      (iii) a priming fuel discharge conduit extending between the interior of said priming bulb and said wick, (iv) a normally closed first check valve in said priming fuel supply conduit which opens to permit fuel to flow into said priming bulb and which closes when said priming bulb is depressed, (v) a normally closed second check valve disposed in said priming fuel discharge conduit, said second check valve being mechanically actuated by external pressure on said priming bulb, to open when said priming bulb is depressed.

* * * * *